April 5, 1932.   E. N. HESCOCK   1,852,080
ADJUSTABLE CABLE REEL
Filed May 2, 1930   2 Sheets-Sheet 1
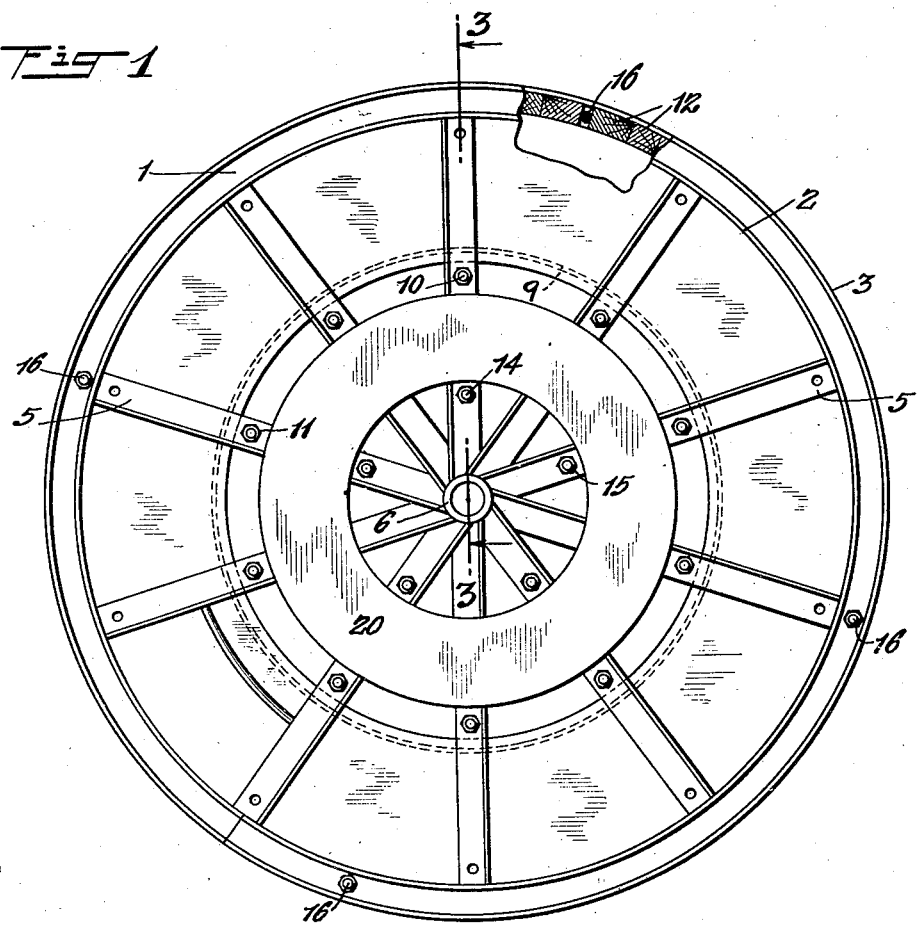
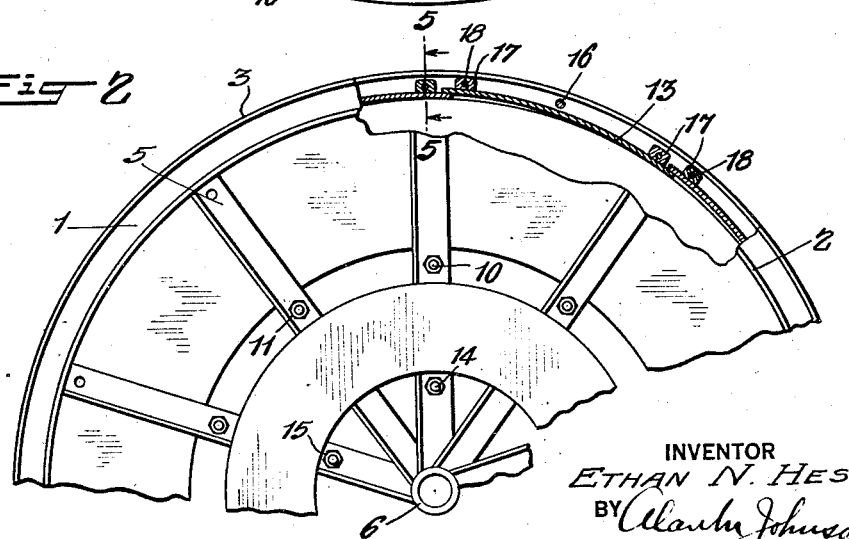
INVENTOR
ETHAN N. HESCOCK.
BY
ATTORNEY April 5, 1932. E. N. HESCOCK 1,852,080
ADJUSTABLE CABLE REEL
Filed May 2, 1930 2 Sheets-Sheet 2
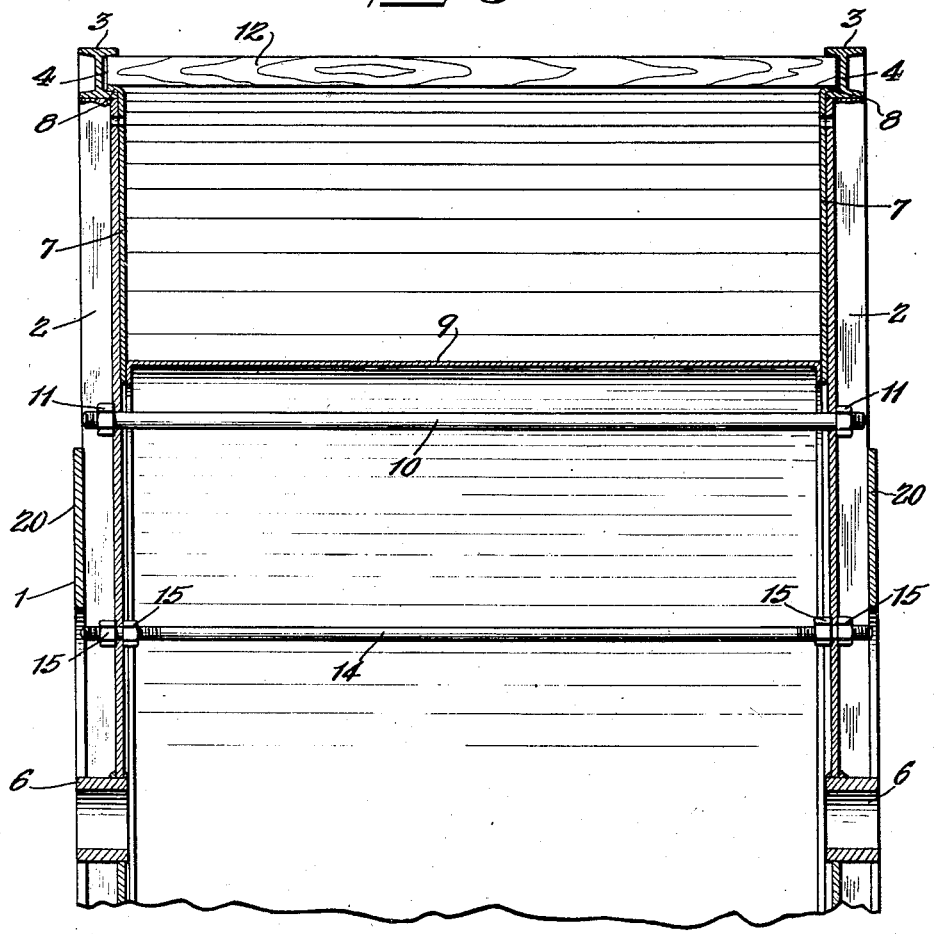
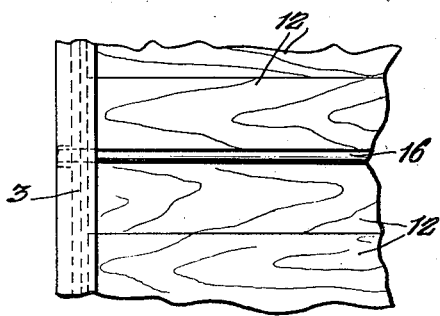
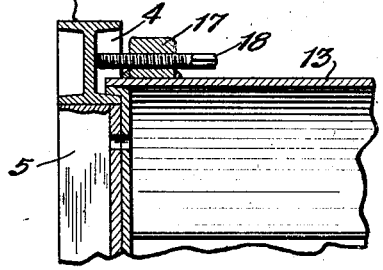
INVENTOR
ETHAN N. HESCOCK.
BY
ATTORNEY Patented Apr. 5, 1932

1,852,080

UNITED STATES PATENT OFFICE

ETHAN N. HESCOCK, OF WESTFIELD, NEW JERSEY, ASSIGNOR TO HENRY B. NEWHALL CORPORATION, OF GARWOOD, NEW JERSEY, A CORPORATION OF NEW JERSEY

ADJUSTABLE CABLE REEL

Application filed May 2, 1930. Serial No. 449,227.

My invention relates to strong metal reels for heavy cable, heavy wire, wire rope, or similar material, and to such a cable reel in which the rims or felloes can be adjusted to and from each other, to obtain the proper spacing.

My invention further relates to combinations, subcombinations, articles of manufacture, and details of construction, which will be more fully hereinafter described in the specification and pointed out in the claims.

In the accompanying drawings showing an illustrative embodiment of my invention, and in which the same reference numerals refer to similar parts in the several figures:—

Figure 1 is a side elevation of my improved reel, partly broken away to show wood lagging.

Figure 2 is a fragmentary side elevation, partly broken away to show my improved metal lagging.

Figure 3 is a vertical section, on line 3—3 of Figure 1, on a large scale.

Figure 4 is a fragmentary plan view of Figure 1, looking down in the direction of the arrow.

Figure 5 is a vertical section on line 5—5 of Figure 2, on an enlarged scale.

Cable reels are used to hold heavy lead covered cable, heavy wire, wire rope, or other heavy material which can be wound upon the drum reels at the place of manufacture, and then the loaded cable reel is transported, in any suitable manner, to the location where the cable, wire, wire rope, or other material is to be used. To wind and unwind the cable, or other material from the reel, the reel is jacked up and temporarily supported so that it may rotate on a temporary axle passed through the hubs of the heads. For short distances, to get the cable reel into its proper position, it is sometimes customary to use the heads of the reel as wheels.

Necessarily, these cable reels have to be very large and very strong to withstand the tremendous load and the rough handling to which they are subjected.

At the same time the contents of the reels must be protected from abrasion, blows, or any distortion, which, in a lead covered cable, may injure the insulation on the wires forming the cable and render the cable valueless.

Wood lagging has commonly been employed to protect the outer layer of the cable or other material wound on wood reels. This wood lagging is expensive for many strips of the lagging are lost in returning the reel, with the lagging, for a new supply of cable or other similar material. Other strips of the lagging are purloined for fire wood while others split and are rendered useless. Then, too, the labor cost, of removing them from the wooden reel, and later removing the nails from the wood, preparatory to again using the lagging when the reel is again loaded, is excessive.

In metal reels for shipping lead covered cable, heavy wire, wire rope, and similar heavy material, the heads of the reel are made of structural metal shapes, to obtain the required strength for the great load that they have to carry. It is found in practice that there is excess manufacturing cost and difficulty in obtaining accurate spacing between the rims or felloes of the two heads of the reel. This is partly due to warping of the complete head in manufacturing, or slight variations in length of the drum at different points, and from other causes.

If the rims or felloes are warped so that they spring inward it may be difficult or impossible to insert the lagging; or, if they are warped so that they spring outwardly the lagging will drop out of place. It is, therefore, necessary to obtain and maintain a uniform distance between the rims or felloes of the two heads to permit the ready insertion, withdrawal, and retention of the lagging, whether that lagging be wood or metal.

A heavy cable reel formed of structural shapes will in use become distorted or warped through rough handling, as for example, accidentally letting the reel drop from a support, or from its temporary axle, or from a car, or from a truck, or other rough handling. If the distortion reduces the distance between the rims or felloes, the lagging will be clamped in the reel making it difficult to remove so that the cable may be unwound at the place of consumption. If the rims or felloes are forced away from each other, the lagging may drop out exposing the contents of the reel.

In either one of these cases just mentioned, the cable reel, at considerable expense, has to be sent back to the factory to be repaired and reshaped.

By my improved invention I permit any adjustment that may be necessary to be made before the cable reel is shipped from the factory; and, if it should become damaged, distorted, or warped in use, the warp or distortion may be corrected on the job, without going to the expense of shipping it back to the manufacturer to be repaired.

In the form of my invention shown, by way of illustration, my reel 1 is formed of two heads 2, 2. The rim or felloe of each head 2 is preferably formed from a structural shape, such as an I-beam, in a bending machine to form a circle, which becomes the rim or felloe 3 of one of the heads 2. The ends of the I-beam are secured together in any suitable manner such as by electric welding. One of the channels of the I-beam becomes a lagging groove 4, as will be more fully hereinafter pointed out. Angle iron spokes 5, 5 are secured by electric welding or otherwise, directly or indirectly to the felloe or rim 3, and to a hub 6, each head 2 having its own hub. Side plates 7, 7 are also preferably secured to the angle iron spokes 5, 5 and to the flange 8 of the rim or felloe, in any suitable manner, such as by peening over the end of the side plates, Figure 3.

A drum 9 is secured between two of the heads 2, 2 by a series of through bolts 10, 10 and their nuts 11, 11 clamping the drum and heads together, the through bolts 10, 10 passing through the angle iron spokes 5, 5.

I employ any suitable adjusting means to control the distance between the two rims or felloes 3, 3 so that the wood lagging 12, Figures 1 and 3, or the metal lagging 13 of Figure 2, will always fit within the co-operating lagging grooves, 4, 4 of the two rims or felloes 3, 3 permitting their ready insertion or withdrawal and also preventing the accidental disengagement of the lagging from the lagging grooves.

I have illustrated one form of adjusting means which I have found in practice to be very satisfactory but, of course, my invention is not to be limited to the particular form illustrated by way of example.

I connect one head 2 with the other head 2 by one or more, preferably a plurality of adjusting rods 14, 14. These rods 14, 14 are located nearer the hubs 6, 6 than the through bolts 10, 10. In the form shown these adjusting rods are connected with the angle iron spokes of each head 2, 2.

By manipulating the nuts 15, 15 on the adjusting rods 14, 14, the portion of the heads extending from the hubs 6, 6 to the through bolts 10, 10 and the edge of the drum 9, will be caused to flex in or out as desired, pivoting on the through bolts 10, 10 and the edge of the drum. This will cause the rims or felloes 3, 3 with their lagging grooves 4, 4 to approach, or recede from, each other, to obtain the proper distance for the reception of the wood lagging 12, 12 or the metal lagging 13, 13.

This means of adjustment will not only overcome any warping or irregularity during the course of manufacturing the cable reels; but should the cable reel rims or felloes 3, 3 be forced towards or away from each other by rough handling in transit or on the job, the adjusting means can be operated to correct the distortion without shipping the reel back to the factory.

In some cases I may use strengthening rods 16, 16, Figures 1 and 4, to connect one rim or felloe to the other. When wood lagging 12 is employed the rods 16, 16 will preferably come between two pieces of lagging, Figures 1 and 4. When metal lagging 13 is employed, Figure 2, the rods 16, 16, will, preferably be located above the metal lagging.

This metal lagging 13 is formed of arcuate strips of metal, and is preferably provided with adjusting means to co-operate with the lagging grooves 4, 4. I have shown by way of example, each metal lagging provided with two adjusting blocks 17, 17 (only one being shown in Figure 5) one on each side of the lagging, and in each adjusting block is mounted a bolt 18. Should the rims or felloes 3, 3 be distorted causing the lagging grooves 4, 4 to approach or recede from each other, such distortion may also be corrected, in whole or in part, by the bolts 18, 18 being screwed in or out of the blocks 17, 17. This form of adjustable lagging may be used with the adjusting means to flex the head by means of the adjusting rods 14, 14 and nuts 15, 15; or, the adjustable means for the heads may be used with non-adjustable lagging, as the wood lagging 12 of Figure 3.

In some cases I may secure a ring 20 to the spokes of the head for a name plate support.

Having thus described my invention in connection with an illustrative embodiment thereof, to the details of which I do not desire to be limited, what is claimed as new and what is desired to secure by Letters Patent is set forth in the appended claims.

What I claim is:

1. A new article of manufacture comprising a cable reel provided with heads having rims or felloes, and means to flex the heads to cause the rims or felloes to be properly spaced with relation to each other.

2. The combination in a cable reel of two heads, a drum, and means adapted to flex portions of the heads by pivoting them on other portions of the reel so that the rims or felloes will be properly spaced one from the other.

3. The combination in a cable reel of two heads, a drum, and means adapted to flex portions of the heads by pivoting them on the drum so that the rims or felloes will be properly spaced one from the other.

4. The combination in a metal cable reel, of two metal heads, a drum, through bolts securing the drum and heads together, and adjusting means located nearer the axis of the reel than the through bolts, adapted to flex the rims or felloes of the heads to and from each other.

5. The combination in a metal cable reel, of two metal heads, a drum, through bolts securing the drum and heads together, and adjusting bolts and nuts located nearer the hub of the reel than the through bolts, adapted to flex the rims or felloes of the heads to and from each other.

6. The combination in a metal cable reel, of two heads, a drum, means to adjust the rims or felloes of the heads to and from each other, and adjustable lagging adapted to cooperate with the adjusting heads.

ETHAN N. HESCOCK.